Jan. 16, 1962     R. W. LANDEE ETAL     3,017,628
METHOD OF AND APPARATUS FOR IDENTIFYING AIRCRAFT DURING
GROUND CONTROLLED APPROACH
Filed June 4, 1956     6 Sheets-Sheet 1

INVENTORS
ROBERT W. LANDEE
BY BURTON CUTLER

ATTORNEY

INVENTORS
ROBERT W. LANDEE
BY BURTON CUTLER
ATTORNEY

INVENTORS
ROBERT W. LANDEE
BURTON CUTLER
BY
ATTORNEY

United States Patent Office 3,017,628
Patented Jan. 16, 1962

3,017,628
METHOD OF AND APPARATUS FOR IDENTIFYING AIRCRAFT DURING GROUND CONTROLLED APPROACH
Robert W. Landee and Burton Cutler, Los Angeles, Calif., assignors to Gilfillan Bros., Inc., Los Angeles, Calif., a corporation of California
Filed June 4, 1956, Ser. No. 589,176
19 Claims. (Cl. 343—5)

The subject matter of this invention in its broad aspect relates to a multi-channel radar tracking system and more specifically to an auxiliary to existing ground controlled approach (GCA) systems to show visually the position of each of a number of aircraft coming in to land, and to exhibit in the elevation picture in juxtaposition to each indication of position a symbol that identifies the tracking channel assigned to each craft. The position of the craft, both as to range from touch down and with respect to a glide path, together with the identifying symbol is shown on an azimuth-elevation (az-el) indicator. Particularly, the present invention concerns the method and means for generating the identifying symbol, and hence the equipment may be termed a symbol, or letter, generator. Inasmuch as this invention adds to, or supplements, the function of a GCA system, it may be termed a functional supplement to the GCA.

The data relative to approaching planes are obtained by a track-while-scan (TWS) radar which feeds a sequencing device that seriatim supplies to each tracking unit the data applicable to the craft in that channel and at the beginning of each scan it initiates a system pulse that causes the operation, in synchronism, of the several components of the device to be described hereafter. Each tracking channel unit puts out a range pulse that defines the relative time-position of the craft in that channel and also an error warning signal if that craft gets into such a position as to constitute a hazard or be in jeopardy.

The TWS radar, the sequencing device, and the tracking channel units are all well known and are of concern here only so far as they are sources of impulses required to effect the results contemplated by this invention.

Each symbol that is generated appears in the elevation picture of the az-el indicator directly below the mark indicating the position of the aircraft in the channel which each symbol designates, and moves in synchronism with the mark as the plane comes in to touch down. Conveniently, letters of the alphabet may be the symbols employed. A logarithmic display on the az-el is preferred, since it expands the scale at shorter ranges where greater accuracy is vital. Distortion of the symbols at short ranges is avoided by employing an exponentially varying voltage to generate the symbol, the voltage increasing the slope of the letter generator horizontal sweep voltage at short ranges.

Normally a fan-shaped sector on the az-el indicator is scanned radially from the vertex of the sector. Symbols or letters are preferably produced only in a portion of the sector. The letter generator includes a plurality of individual cathode-ray type electron tubes to produce a number of symbols or letters corresponding to the identities of aircraft, which number is representative of the capacity of the associated GCA system. It would normally be necessary to scan both the electron-tubes and the indicator synchronously. Although it is an object of the invention to provide an image of a symbol adjacent a range indication to identify the range indication with a corresponding tracking channel, absolute juxtaposition is obviated by the present invention wherein a novel switching arrangement is employed to provide a different horizontal sweep voltage for each of the cathode-ray type electron tubes. In accordance with this feature of the invention although one horizontal sweep generator for each electron tube is required, only one vertical sweep generator for all the electron tubes is required. Equipment is thus economically employed.

According to another novel feature of the invention, the above described switching arrangement is employed to prevent the presentation of a letter in the scan sector of the indicator near the vertex of the sector. This prevents a symbol image from interfering with the range indication of an aircraft near touchdown.

Among the several objects of this invention are:

In controlling from the ground the landing of approaching aircraft, to provide a means and a method to show, on an indicator, a symbol that identifies the channel in which each plane is being tracked, the symbol being adjacent to and moving in synchronism with the indication of each respective plane;

To show, in connection with any symbol, a warning if a dangerous situation exists with reference to a plane designated by that symbol;

To provide a method and means for maintaining the size of the symbol substantially uniform in its movement on an indicator having an exponential scale.

Referring now to the drawings.

While this invention is particularly applicable to systems for automatic ground controlled approach, its usefulness is not limited thereto. The block diagrams indicate tracking in six channels but a greater or smaller number of channels may be utilized. Whenever specific values are given, they are employed for example or illustration and not by way of limitation.

Generation of the symbols is effected by the flying spot scan by an electron stream in the manner well known in television. The sensitive surface at which the energy of the electrons of the stream is converted has portions of differential energy-transmissive capacity. Thus, the said surface may have on either side of it, or between it and the source of the electron stream, a mask or stencil which will prevent the electrons reaching the sensitive surface except over an area having the confromation of the desired symbol and therefore as the stream scans over the surface conversion of the electron energy takes place at such parts of the scan as to generate video signals of the symbol. It is, of course, obvious that, alternatively, the sensitive surface may itself be in the form of the symbol so that all other parts of what would be a normal raster remain unresponsive.

Figure 1:
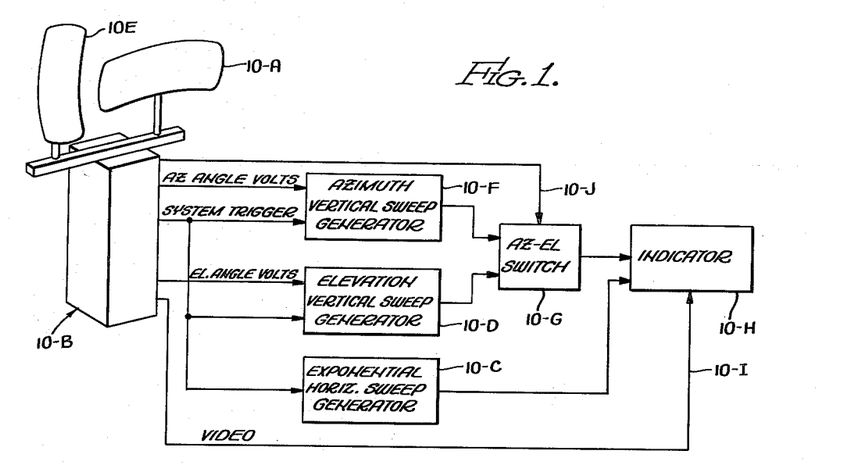
FIG. 1 is an isometric and partial block diagram of a conventional az-el indicator system.

A conventional indicator system is shown in FIG. 1 comprising radar gear 10–B including an elevation antenna 10–E and an azimuth antenna 10–A. The indicator system employed with the radar gear 10–B includes an exponential horizontal sweep generator 10–C, an elevation vertical sweep generator 10–D, an azimuth vertical sweep generator 10–F, an az-el switch 10–G, and an indicator 10–H. Range pulses are applied to the indicator 10–H on a video lead 10–I. The exponential horizontal sweep generator 10–C is employed to produce an exponential horizontal sweep to widen the indicator display at reduced ranges. This permits closer inspection of planes approaching touchdown. The elevation vertical sweep generator 10–D is driven by the system trigger and produces a vertical sawtooth sweep voltage when the elevation antenna 10–E operated.

In the system of FIG. 1 it is intended that a time sharing basis be made for displaying the range of an aircraft both as a function of azimuth and elevation on the same indicator. After the elevation antenna 10–E scans upwardly, the azimuth antenna 10–A may scan to the left; the elevation antenna 10–E may then scan downwardly and the azimuth antenna 10–A may scan to the right. The elevation vertical sweep generator 10–D, when operated by the system trigger, produces a vertical sweep voltage having a slope proportional to the elevation angle voltage which is representative of the angular position of the elevation antenna 10–E. Similarly the azimuth vertical sweep generator 10–F, when operated by the system trigger, produces a sawtooth voltage having a slope proportional to the azimuth angle voltage which is representative of the angular position of the azimuth antenna 10–A.

The az-el switch 10–G is provided with an az-el gate over lead 10–J from the radar gear 10–B. The az-el gate appearing on the lead 10–J thus causes only the output signal of the elevation vertical sweep generator 10–D to be passed by the az-el switch 10–G to the indicator 10–H when the elevation antenna 10–E scans and causes only the output voltage of the azimuth vertical sweep generator 10–F to be passed by the az-el switch 10–G to the indicator 10–H when the azimuth antenna 10–A scans.

A brief description of the az-el indicator system is deemed necessary in order to better explain the utility of the present invention which is used in cooperation with the indicator 10–H. Integration of the present invention may also be better understood by reference to the sweep voltages shown in FIG. 2 where the waveform 20–A represents the output of the exponential horizontal sweep generator 10–C and the waveform 20–B is representative of the output of either the elevation vertical sweep generator 10–D or the azimuth vertical sweep generator 10–F. For example, as the elevation antenna 10–E increases the slope of the sawtooth waveform 20–B increases proportionally.

Figure 2:
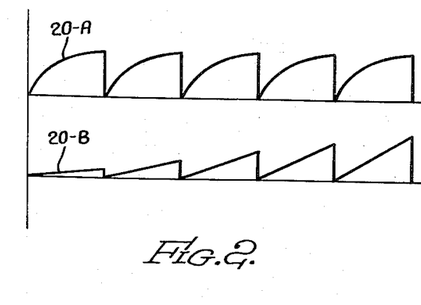
FIG. 2 is a graph of two waveforms characteristic of the operation of several components of the system shown in FIG. 1.
Figure 3:
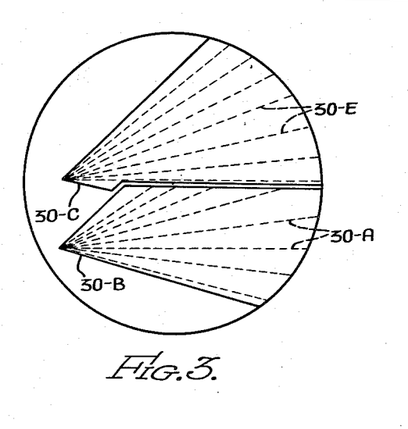
FIG. 3 is a schematic view of the face of an indicator shown in block form in FIG. 1.

Due to the fact that both the waveforms 20–A and 20–B are initiated by the system trigger, the beam of the indicator 10–H, which may be a cathode-ray type tube, is swept at an angle as indicated by the dashed lines 30–A and 30–E in FIG. 3 where the face of the indicator is shown. In the system shown in FIG. 1 the beam of the indicator is swept across two sectors 30–B and 30–C corresponding to azimuth and elevation pictures, respectively. Range is the abscissa of both the sectors shown in FIG. 3. Video is appropriately blanked to provide the peculiarly shaped sectors 30–B and 30–C. According to the time sharing feature of the system shown in FIG. 1 the succeeding lines 30–A may be generated one above a preceding one, and then lines 30–E may be generated one above a preceding one. As the elevation antenna 10–E scans downwardly the lines 30–E are traced from the vertex of sector 30–C in a downward direction. As the azimuth antenna 10–A scans to the right, the lines 30–A may also be traced across and in a downward direction.

Figure 4:
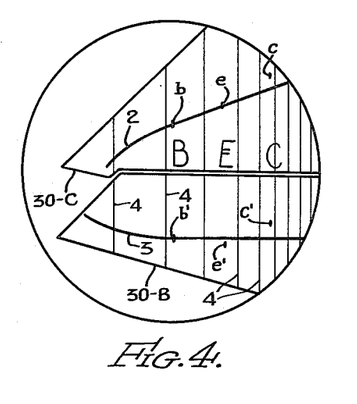
FIG. 4 is a more detailed and enlarged view of the face of the indicator shown in FIG. 1.

FIG. 4 depicts the appearance of the face of the az-el indicator 10–H functioning according to the present invention. Lines 2 and 3 are cursor lines in elevation and in azimuth respectively. These are electronically produced intensity lines representing the idealized glide path and the idealized course in azimuth for aircraft landing under control of the installation.

The spots $b$, $e$ and $c$ shown in the elevation picture are the positions of three aircraft with respect to the glide path defined by cursor line 2 and the letters B, E and C under the spots identify the tracking channel assigned to each respective craft. Spots $b'$, $e'$ and $c'$ show the positions of the same craft with respect to the landing course represented by azimuth cursor line 3. Vertical lines 4, 4, etc., mark distance from the touch down point, becoming closer together as distance from that point increases due to the logarithmic scale used in the indicator.

According to the invention, the letter E in FIG. 4 is alternately inverted to provide a warning that the aircraft $e$ in FIG. 4 is in jeopardy or is causing a hazard to other aircraft. The inverted letter E may alternatively be positioned in the azimuth sector 35–B although it is shown in FIG. 4 in the elevation sector 30–C.

Figure 5:
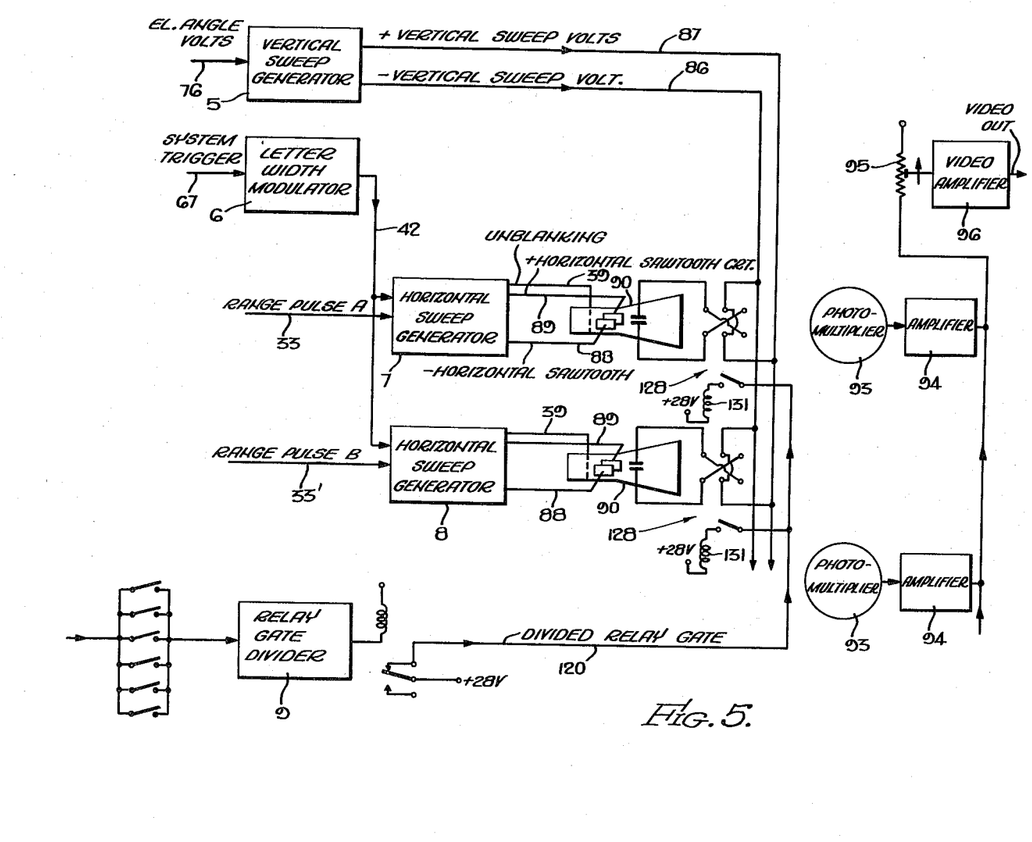
FIG. 5 is a block diagram of one form of symbol generator and warning system of the present invention.

FIG. 5 is a block diagram of one embodiment of the invention as exemplified by the components for two radar tracking channels. The elevation angle voltage, generated by the vertical scan of the precision tracking radar comes over lead 76 to initiate vertical sweep voltage generator 5 from which the positive and negative vertical sweep voltages go over leads 87 and 86, respectively, to all the cathode ray tubes 90, of which there is one in each tracking channel. A system trigger pulse over lead 67 sets in operation the letter width modulator unit 6 which generates an exponentially varying voltage which via lead 42 is applied to each horizontal sweep voltage generator 7, 8, etc. to control the duration of the horizontal sweep voltage pulses as an exponential function of the distance of the craft in the respective tracking channel from touch down, to prevent distortion on the az-el indicator of the symbol designating the tracking channel. The distance to the craft is measured by the time interval between the system trigger pulse and the range pulse that comes over lead 33, 33', etc., to each horizontal sweep generator. The positive and negative horizontal sweep voltages are applied to the cathode ray tube 90 by leads 89 and 88, respectively, and a pulse to unblank the cathode ray tube is transmitted over lead 39. A respective photomultiplier 93 views each two of the cathode ray tubes 90 and amplifies their output about a million times, the output of the photomultiplier going to a video pre-amplifier 94 and thence the outputs of all the pre-amplifiers 94 are transmitted to video amplifier 96 through video gain control 95. Relay gate divider 9 controls the functioning, through a system of relays as is explained in detail in connection with FIG. 12, of relay 131 which operates the double pole double throw switch 128 to reverse the leads by which the vertical sweep voltage is applied to cathode ray tube 90 and so cause inversion of the symbol in response to an error warn signal.

Figure 6:
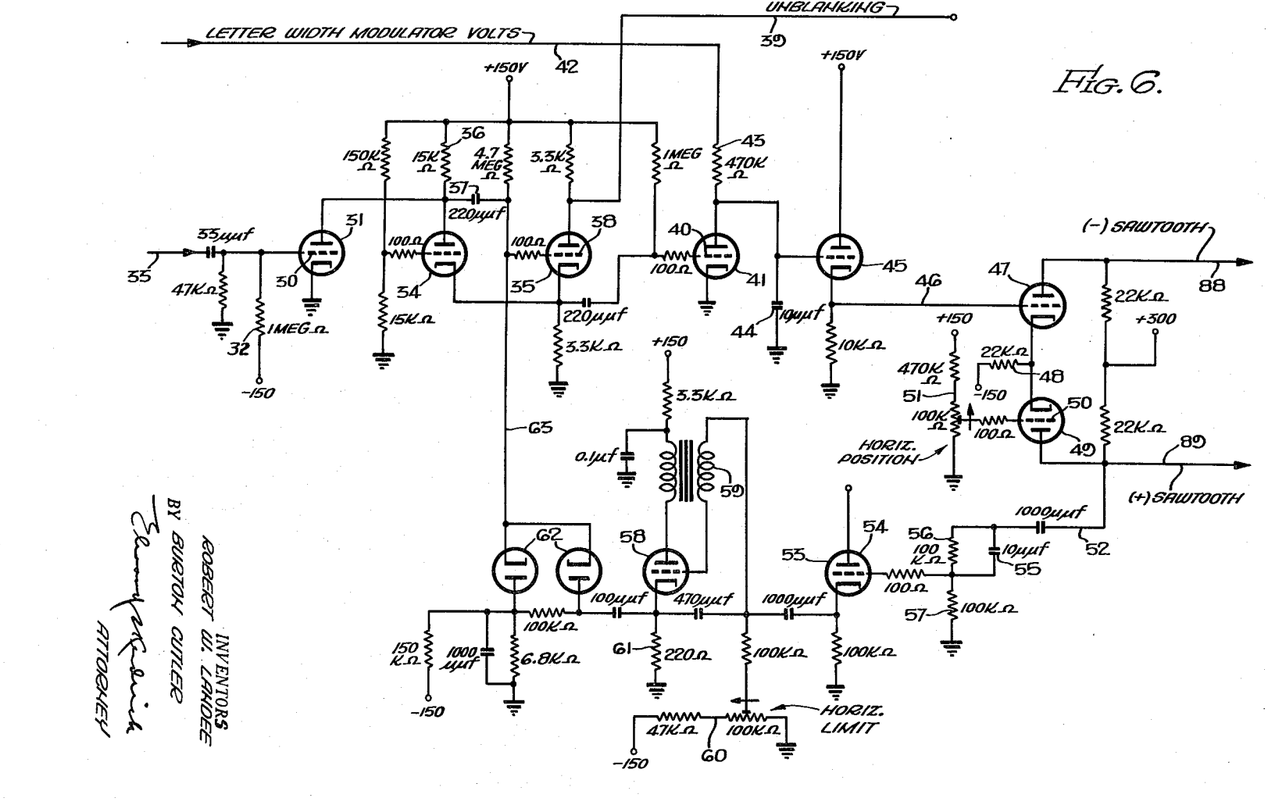
FIG. 6 is a diagram of the circuitry for generating a horizontal sweep voltage.

Reference is made to FIG. 6 wherein the grid 30 of a triode 31 is biased beyond cut-off by being connected to a resistor 32 having one terminal at ground potential and the other at minus 150 volts. Lead 33 connects grid 30 to a source of range pulse, which for discussion may be considered to represent the distance to a plane in channel A. Each channel that is tracking an aircraft has a range voltage unique thereto at each scan. Triodes 34 and 35 are connected together to operate as a monostable multivibrator wherein tube 35 is normally conducting. When a range pulse comes in, triode 31 is made to conduct and the drop in voltage at the low end of resistor 36 is transmitted via capacitor 37 to grid 38 of tube 35 which is thus cut off and tube 34 is made conductive and so holds tube 35 cut off.

A 30 volt positive pulse appears at the plate of tube 35 when this tube is cut off and the pulse is transmitted over lead 39 to unblank a cathode ray tube (CRT) 90 during the horizontal sweep, as will be explained hereafter. A 15 volt drop in potential at the high end of the cathode resistor when tube 35 is cut off is applied to grid 40 of tube 41, the grid 40 being normally near zero volts. It will be noted that grid 40 of 241 is connected to +150 volts through a 100 ohm resistor and a one megohm resistor, the latter being simply a grid leak resistor such that grid 40 draws a little current. The resistance of tube 41 between grid 40 and the cathode of tube 41, which is connected to ground, is so low in comparison to the grid leak resistor that grid 40 in the condition stated is therefore mounted very nearly at ground potential. The letter modulating volts, the source of which will be set forth later, are applied to the plate of tube 41 through lead 42 and resistor 43 which, through the action of capacitor 44, builds up the voltage at the plate of tube 41 exponentially to the value of the letter width modulating voltage. This exponentially rising voltage is applied to the grid of cathode follower tube 45 which generates a 30 volt pulse that is, via lead 46, put on the grid of sweep amplifier tube 47 that has common cathode resistor 48 with tube 49. The grid 50 of tube 49 is biased from divider 51 so that tube 49 is normally conducting. This bias also controls the position of the spot on the CRT. When tube 47 is made to conduct, a negative sawtooth pulse of 150 volts appears at the plate. The rise of potential at the high end of cathode resistor 48 makes the cathode of tube 49 more positive, cuts down the current through tube 49 and generates a positive 150 volt sawtooth pulse at the plate of tube 49. These two sawtooth pulses are applied to the horizontal sweep plates of the CRT, via leads 88 and 89, respectively.

The positive sawtooth pulse is applied also through lead 52 to grid 53 of tube 54 through attenuating RC network 55, 56, and 57. Tube 54 is a cathode follower and applies a 40 volt pulse to the grid of blocking oscillator tube 58 through inductor 59. When the amplitude of the positive sawtooth reaches a value determined by the setting of biasing divider 60, the blocking oscillator fires and produces a sharp positive pulse of 40 volts across its cathode resistor 61, which pulse is transmitted through diodes 62 and lead 63 to the grid of tube 35 to render tube 35 conducting and restore the multivibrator of its stable state and end the horizontal sweep. The diode 62 functions also as a "catching" diode to prevent the grid of tube 35 from going too far negative and thus insures that the 40 volt sweep shutoff pulse will turn tube 35 on again when the sweep pulse has reached the proper amplitude. Thus, although the duration of the horizontal sweep is determined by the letter width modulating pulse, the amplitude of the sweep pulse is kept constant by the setting of divider 60. Resumption of conducting by tube 35 also ends the unblanking pulse from the plate of this tube.

Figure 7:
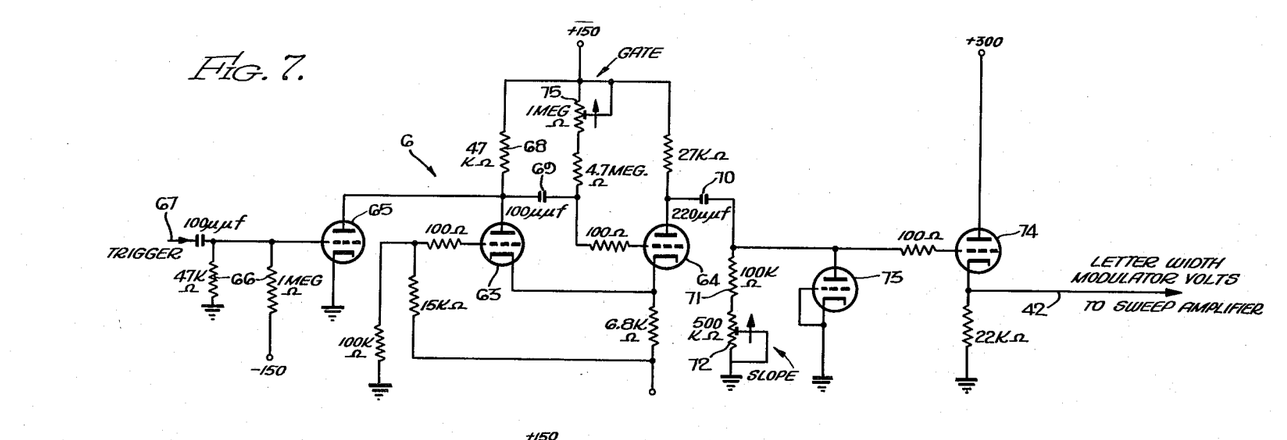
FIG. 7 is a circuit diagram of a generator to produce an exponentially varying letter modulation pulse.

The manner in which the duration of the horizontal sweep sawtooth is varied is as follows:

The letter width modulating voltage pulse is initiated by the system trigger pulse, and diminishes exponentially from its initial value of about 150 volts positive until it is clipped by diode 73 (FIG. 7). Application of the letter width modulating voltage to the plate of tube 41 (FIG. 6) has no effect so long as this tube is conducting. The range pulse applied via lead 33 effects cut-off of tube 41 so that the width modulating pulse becomes effective, and the duration of that effectiveness is determined by the time between the system trigger pulse and the range pulse, i.e., by the range. If tube 41 is cut off while the value of the width modulating pulse is high, the output of tube 45 quickly reaches 30 volts and the stable condition of conduction of tube 35 is early restored. However, if the range pulse is delayed some time after the system trigger, it requires longer for the output of tube 45 to be brought up to 30 volts and the restoration of conduction to tube 35 is retarded, so that the duration of the horizontal sawtooth is augmented.

Derivation of the letter width modulating voltage will now be explained with reference to FIG. 7. Cathode coupled tubes 63 and 64, together with the associated circuitry shown, constitute a monostable multivibrator whereof the stable condition is with tube 64 conducting. The grid of trigger tube 65 is biased to cut-off by divider 66, but when a system trigger pulse is received over lead 67, tube 64 conducts causing a negative pulse to appear at the low end of resistor 68 which pulse is applied to the grid of tube 64 through capacitor 69, cutting off tube 64 and throwing tube 63 into the conductive state. The positive pulse that appears at the plate of tube 64 when this tube is cut off is transmitted through capacitor 70 and resistors 71 and 72, subject to clipping by diode 73, to the grid of cathode follower tube 74. Adjustable resistor 75 determines the length of the positive gate from the plate of tube 64 (preferably about 150 microseconds), while the time constant effect of capacitor 70 and resistors 71 and 72, variable by adjusting the last, determines the slope of the letter width modulating pulse from the cathode of tube 74. The diode 73 clips the negative portion of the differentiated gate, and the pulse is transmitted over lead 42 to the grid of cathode follower tube 45 and thence to the grid of horizontal sweep amplifier tube 47, FIG. 6.

Figure 8:
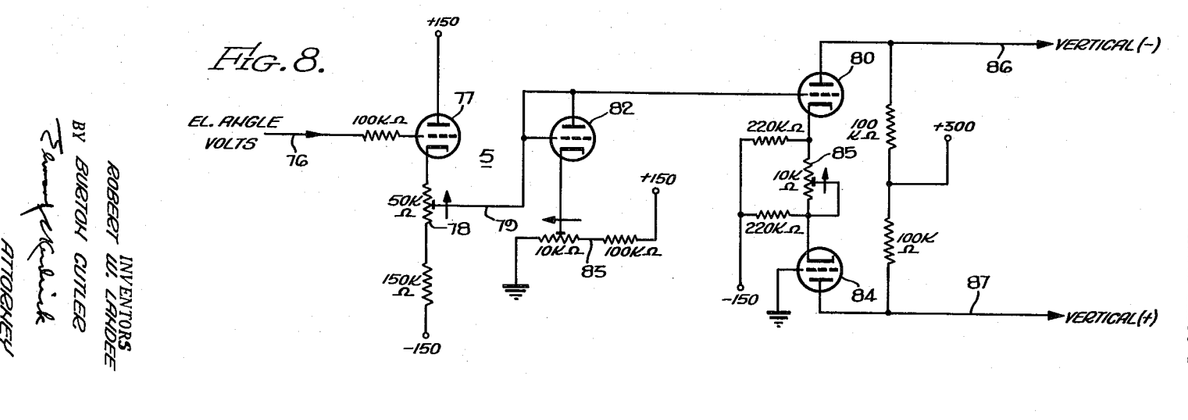
FIG. 8 is a circuit diagram of a vertical sweep voltage generator.

FIG. 8 depicts the circuits for producing the vertical sweep voltage. Elevation angle voltage, representing the vertical angle swept by the precision radar, comes over lead 76 to the grid of tube 77, a cathode follower which has voltage divider 78 in its cathode circuit to adjust the D.C. level of the angle volts and so control the angular position of the letter. Divider 78 is connected through lead 79 to the grid of tube 80 in balanced sweep amplifier 81. Diode 82 is connected to lead 79 to protect the grid of tube 80, the cathode of diode 82 being connected to divider 83. Triode 84 is the other tube in balanced sweep amplifier 81. The cathodes of tubes 80 and 84 are connected by variable resistor 85 which controls the height of the letter. Conduction through tube 80 brought about by the elevation angle voltage results in a negative pulse from the plate of tube 80 and a positive pulse from the plate of tube 84, which pulses are transmitted over leads 86 and 87, respectively, to the vertical sweep plates of all the CRT's, there being but one vertical sweep generator instead of an individual generator for each channel as in the case of the horizontal sweeps.

The elevation angle voltage varies continuously during scan in one direction from, for example, plus 2 volts to plus 52 volts, and on the return scan the change is from plus 52 volts to plus 2 volts. Divider 78 is typically set so the plate of diode 82 and the grid of tube 80 are held at minus 20 volts when no signal is present. The varying elevation angle voltage applied to the grid of tube 77 causes a varying flow of current through resistor 78 and so produces a varying current through tube 80 which gives rise to a changing negative sweep voltage at the plate of tube 80. The change in potential of the cathode of tube 84 due to current through tube 80 causes changes in the current through that tube and hence in the positive sweep voltage from its plate. At the end of each scan when no elevation angle voltage is present, both these vertical sweep voltages go to zero.

Figures 9, 10:
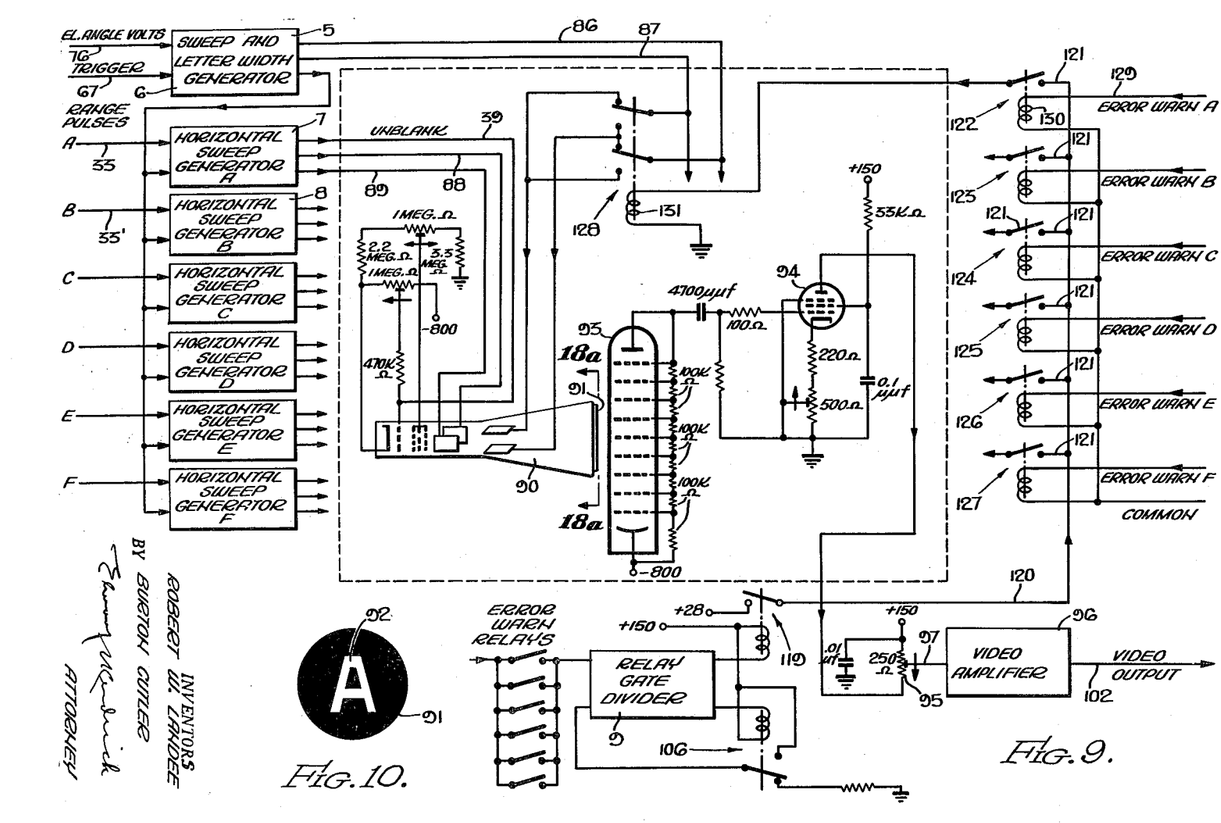
FIG. 9 illustrates a cathode ray tube and photo multiplier for producing video signals of the symbols, together with error warning signal relays.
FIG. 10 is a face view of the cathode ray tube screen with a stencil or mask to define a symbol thereon.

FIG. 9 shows the lead 39 connected to cathode ray tube 90 to apply the unblanking pulse thereto and likewise the leads 86 and 87 for the vertical sweep and the leads 88 and 89 for the horizontal sweep. Covering the screen of the CRT is an opaque mask 91 having in it a stencil or transparent portion 92 in the form of a symbol, which is illustrated in the form of the letter A to identify one of the tracking channels. Adjacent the CRT 90 is a photomultiplier tube 93. As the beam of the CRT 90 scans the screen light will pass through the transparent symbol whenever the electron beam is directed upon the symbol, and those pulses of light will, by tube 93, be converted into fluctuating electric currents which will be amplified about a million times in tube 93. One photomultiplier tube will view two cathode ray tubes so that in a system that tracks six channels there will be six cathode ray tubes and three photomultiplier tubes. Thus the energy of the electron streams is converted into electric currents constituting video signals. The video signals put out by tube 93 are amplified by tube 94 and the amplified video signals from all three photomultipliers are mixed in a common load resistor 95 which is adjustable to vary the video gain and then introduced by lead 97 into video amplifier 96 which has an output at about a two volt level.

Figures 11, 12:
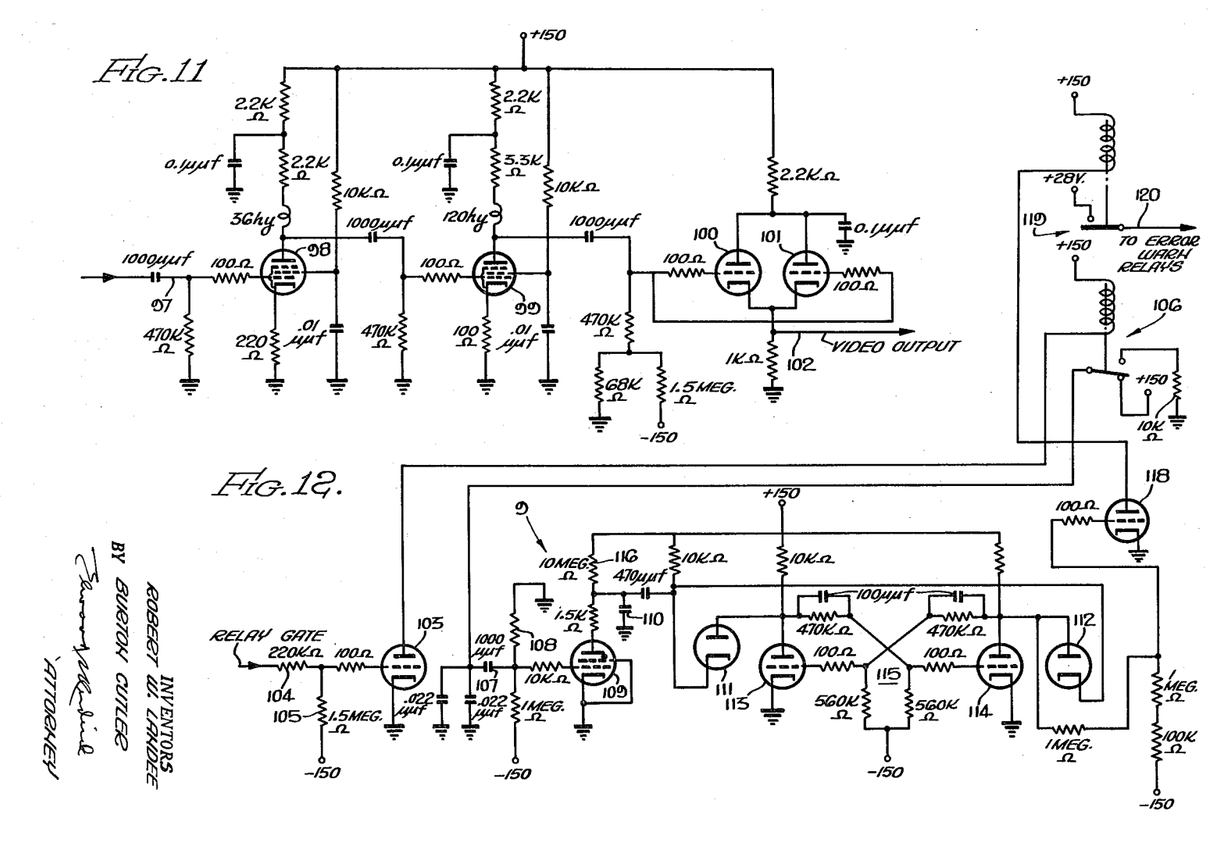
FIG. 11 shows the video amplifier.
FIG. 12 shows a unit of circuitry used for producing the warning signal.

The circuit of the video amplifier is diagrammed in FIG. 11. It is a two stage shunt peaked amplifier, the video signal output from load resistor 95 coming at about 0.1 volt over lead 97 to the control grid of a first pentode 98 which amplifies it to one volt and inverts it. The output of tube 98 is applied to the control grid of pentode 99 where it is amplified ten times to 10 volts and again inverted, this signal being put on the grids of tubes 100 and 101 which are connected as a cathode follower and drive the output cable 102. This signal is then mixed with the composite video from the GCA and displayed on the precision az-el indicator.

The utmost safety in operating an airfield under GCA requires that warning be given when an approaching craft gets into a dangerous positional situation. The present invention is not concerned with generating an error warning signal, but it does contemplate the utilization of such signal generated by the GCA system to apprise ground control personnel of the existence thereof.

The plus 28 volt relay gate is applied to the grid of tube 103 through the resistance network 104 and 105 so that tube 103 conducts and operates relay 106 (FIG. 12). This closes the circuit from plus 150 volt source to the differentiating network that includes capacitor 107 and resistor 108 which applies to the grid of thyratron 109 a sharp positive spike and triggers the thyratron. The thyratron discharges capacitor 110 and produces a sharp negative spike which is applied through diodes 111 and 112 to tubes 113 and 114, respectively, of bistable multivibrator 115. Obviously a negative pulse applied to the grid of a tube that is not conducting would have no effect, so each spike from thyratron 109 cuts off whichever of tubes 113 and 114 is at the instant conducting and throws conduction to the other tube. Capacitor 110 recharges slowly through resistor 116 in preparation for the next pulse from thyratron 109.

When tube 113 is conducting, its plate is at plus 50 volts and the plate of tube 114 is at plus 150 volts. Diode 111 is cut off because its anode is at plus 50 volts and its cathode is at plus 150 volts, whereas the anode and the cathode of diode 112 are both at plus 150 volts. The negative pulse from thyratron 109 will not get through diode 111 which is cut off but will pass through diode 112 to the grid of tube 113 which will then be cut off and the rise of voltage at the plate of 113 will be put on the grid of tube 114 which will then go into conduction. The drop in voltage at the plate of tube 114 will go to the grid of tube 113, holding the latter cut off. Thus each time thyratron 109 is fired, conduction is shifted from one tube to the other in multivibrator 115. Each time tube 114 is cut off, the rise in voltage at its plate is transmitted through lead 117 to make tube 118 conduct which closes relay 119. It is thus apparent that relay 119 is closed every alternate time the relay gate is applied to tube 103 and that the frequency of operation of relay 119 is one-half the frequency of the relay gate. The divided relay gate, or one-half frequency gate, from multivibrator 115 is transmitted over lead 120 to a contact 121 of each of the relays 112—127. These relays are normally open but any one of them may be closed by an error warn signal from the tracking channel to which each respective relay is assigned. Inserted in the vertical sweep leads 86 and 87 to each CRT 90 is a relay 128 in the form of a double pole-double throw switch that normally remains closed in one position. However, when an error warn signal is received over, say, lead 129 the solenoid 130 of the associated relay 122 is energized and the relay is closed, connecting lead 120 to solenoid 131 of relay 128 which reverses the connection of leads 86 and 87 to the vertical sweep plates of CRT 90, so that on each alternate sweep of the indicator the letter designating the tracking channel from which the error warn signal came is shown in inverted position on the az-el indicator and thus apprises the operation of the error warn signal.

Another specific embodiment of the invention, not disclosed herein, is disclosed in copending United States patent application Serial No. 489,175, filed June 4, 1956, by James Foy for Identification System, now Patent No. 2,935,744. It will be obvious to those skilled in the art that many other changes and modifications of the invention may, of course, be made without departing from the true scope thereof as defined in the appended claims.

We claim:

1. In a ground controlled approach system that has a track-while-scan assembly and includes devices to generate cyclically a discrete range pulse unique to a respective aircraft in each of a plurality of tracking channels, an elevation angle signal, an error warning signal when an aircraft in any channel gets into a dangerous situation, and a system trigger pulse at the beginning of each cycle of range pulses, and also includes an indicator responsive to range signals to display a continuous visual indication of the position of each aircraft being tracked: a novel functional supplement including a cathode ray tube having a screen whereof a portion is obscured so that the unobscured portions define a symbol, means responsive to the elevation angle signal to generate a vertical sweep sawtooth voltage for the tube, means responsive to a range pulse to generate a sawtooth horizontal sweep voltage for the tube, means to limit the duration of the horizontal sweep sawtooth as a function of the range, photoelectric means responsive to light from the screen of the cathode ray tube to convert into electric currents the light from the unobscured portions of the screen as it is scanned, means to amplify such currents, and means to mix the amplified currents with signals from the said assembly and to apply the mixed currents and signals to the indicator where the said amplified currents produce the symbol adjacent to and moving in synchronism with the positional indication of the craft to which the symbol is related.

2. A system including a functional supplement as defined in claim 1 wherein the unobscured portions of the screen are in the form of the symbol.

3. A system including a functional supplement as defined in claim 1 which further includes means responsive to an error warning signal to change cyclically the attitude of the symbol as displayed on the indicator to give visual notice of the error warning signal.

4. A system as described in claim 1 that includes a plurality of the cathode ray tubes with the requisite controlling and operating circuitry for each, a photoelectric means to view each two cathode ray tubes to convert into electric currents the light from the unobscured portions of the screens of such tubes as they are scanned, means to amplify such currents, and means to mix all the amplified currents with signals from the said assembly and to apply the mixed currents and signal to the indicator where the said amplified currents from each cathode ray tube produce a respective symbol adjacent to and moving in synchronism with the positional indication of the craft to which the symbol is related.

5. In a ground controlled approach system that has a track-while-scan assembly and includes devices to generate cyclically a discrete range pulse unique to a respective aircraft in each of a plurality of tracking channels, an elevation angle signal, an error warning signal when an aircraft in any channel gets into a dangerous situation, and a system trigger pulse at the beginning of each cycle of range pulses, and also includes an indicator responsive to range signals to display a continuous visual indication of the relative position of each craft being tracked: a novel functional supplement including means to generate a stream of electrons, means responsive to the elevation angle signal to generate a vertical sweep voltage, means responsive to a range pulse to generate a horizontal sweep voltage, means to apply the two sweep voltages to sweep the electron stream, means including an element that delineates a symbol disposed to limit the effective surface scanned by the electron stream to an area in the form of the symbol, means to convert energy derived from the electron stream into fluctuating electric currents that constitute a video signal capable of producing a visual image of the symbol, means to mix the video signal with signals from the said assembly to the indicator, and means to apply the mixed signals to the indicator to produce an image of the symbol adjacent to and moving in synchronism with the positional indication of the craft in the tracking channel designated by the symbol.

6. A system as described in claim 5 wherein the means for converting the energy of the electron stream into video signals comprises a screen capable of being excited to luminescence by impact of the electrons thereon disposed in the path of the electron stream and a photoelectric tube disposed to view the screen, and the said element that delineates the symbol is between the screen and the photoelectric tube and has portions in the form of the symbol, the said portions being light-transmissive.

7. A system as described in claim 6 including further means controlled by the system trigger pulse to generate an exponentially varying voltage pulse, means to apply the exponential pulse to the horizontal sweep generator to govern the duration of the horizontal sweep as an exponential function of the time lapse between the system trigger pulse and the range pulse that initiated the sweep voltage.

8. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sweep voltage having a predetermined trace period, and means for applying a first vertical sawtooth sweep voltage to the indicator, said first vertical sweep voltage having a slope proportional to the scanning angle of the radar gear, the combination comprising: a plurality of cathode-ray type electron tubes, an element for each of said tubes delineating an area in the form of a symbol in a plane substantially perpendicular to the axis of each of said tubes, said symbols representing the identities of aircraft in the system, first means responsive to symbol range pulses corresponding to particular aircraft for applying second horizontal sweep voltages to corresponding ones of said tubes at different times corresponding to the times at which said respective symbol range pulses are received, said first means being responsive to a particular symbol range pulse for applying only a particular one of said second horizontal sweep voltages to a particular one of said electron tubes, said second horizontal sweep voltages having trace periods substantially less than said predetermined trace period, second means for applying a second vertical sawtooth sweep voltage to each of said tubes, said second vertical sweep voltage also having a trace period substantially less than that of said first vertical sweep voltage and having a slope proportional to that of said first vertical sweep voltage, third means for producing video signals proportional to the time that the cathode rays of said tubes are directed toward the areas of said symbols, and fourth means for applying said video signals to the indicator to produce images of said symbols adjacent to and moving in synchronism with the range indications of corresponding aircraft, said images thereby identifying said range indications with said corresponding aircraft.

9. The invention as defined in claim 8, wherein the slopes of said second horizontal sweep voltages are proportional to the amplitude of said first horizontal sweep voltage.

10. The invention as defined in claim 9, wherein said first horizontal sweep voltage increases exponentially.

11. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sawtooth sweep voltage having an amplitude increasing exponentially, and means for applying a first vertical sawtooth sweep voltage to the indicator, said first vertical sweep voltage having a slope proportional to the scanning angle of the radar gear, the combination comprising: a plurality of cathode-ray type electron tubes, an element for each of said tubes delineating an area in the form of a symbol in a plane substantially perpendicular to the axis of each of said tubes, said symbols representing the identities of aircraft in the system, means responsive to said symbol range pulses for applying a plurality of second horizontal sweep voltages to each of said tubes at different times corresponding to the times at which said respective symbol range pulses are received, said first means being adapted to apply one of said second horizontal sweep voltages to a corresponding particular one of said electron tubes, said second horizontal sweep voltages having trace periods substantially less than the trace period of said first horizontal sweep voltage, second means for applying a second vertical sawtooth sweep voltage to each of said tubes, said second vertical sweep voltages also having a trace period substantially less than the trace period of said first vertical sweep voltage and having a slope proportional to that of said first vertical sweep voltage, third means for producing video signals proportional to the time that the cathode-ray of said electron tubes are directed toward the areas of said symbols, fourth means for applying said video signals to the indicator to produce images of said symbols adjacent to and moving in synchronism with the range indications of corresponding aircraft, said images thereby identifying said range indications with said corresponding aircraft, and means for maintaining the slopes of said second horizontal sweep voltages proportional to the amplitude of said first horizontal sweep voltage to minimize the distortion of the images of said symbols on said indicator.

12. In a system for displaying the position of an object including oscillographic means having means for sweeping the beam thereof successively at different positions across its face, and means for modulating said beam to produce an indication of the position of said object, a functional supplement for said system, said functional supplement comprising: means for producing electrical gating signals at predetermined times that said beam passes through one of the coordinate positions of said object; means responsive to said gating signals to produce a video signal representative of an identifying symbol for said object; and means for modulating said beam also in accordance with said video signal, whereby said symbol will be produced in visual correspondence to and will move in synchronism with the position indication of said object on the face of said oscillographic means.

13. In a system for displaying the positions of a plurality of objects including a cathode-ray tube having means for sweeping the electron beam thereof successively at different positions across its face, and means for modulating said beam to produce an indication of the positions of said objects, a functional supplement for said system, said functional supplement comprising: means for producing electrical gating signals at predetermined times that said beam passes through one of the coordinate positions of each of said objects; a plurality of video signal generators corresponding to each of said objects, each of said video signal generators being responsive only to gating signals of a single corresponding object for producing a video signal representing a different identifying symbol for each corresponding object; and means for modulating said electron beam also in accordance with video signals produced by said video signal generators, whereby symbols will be produced in visual correspondence to and will move in synchronism with corresponding position indications of said objects on the face of said tube.

14. In a system for displaying the position of an object including a cathode-ray tube having means for sweeping the electron beam thereof successively at different positions across its face, and means for modulating said beam to produce an indication of the position of said object, a functional supplement for said system, said functional supplement comprising means for producing electrical gating signals at predetermined times that said electron beam passes through the range coordinate position of said object; means responsive to said gating signals to produce a video signal representative of an identifying symbol for said object; and means for modulating said electron beam also in accordance with said video signal, whereby said symbol will be produced in visual correspondence to and will move in synchronism with the position indication of said object on the face of said tube.

15. In a system for displaying the positions of a plurality of objects including a cathode-ray tube having means for sweeping the electron beam thereof successively at different positions across its face, and means for modulating said beam to produce an indication of the positions of said objects, a functional supplement for said system, said functional supplement comprising: means for producing electrical gating signals at predetermined times that said electron beam passes through the range coordinate position of each of said objects; a plurality of video signal generators corresponding to each of said objects, each of said video signal generators being responsive only to gating signals corresponding to a single object for producing a video signal representing a different identifying symbol for a corresponding object; and means for modulating said electron beam also in accordance with video signals produced by said video signal generators, whereby symbols will be produced in visual correspondence to and will move in synchronism with corresponding position indications of said objects on the face of said tube.

16. In a system for displaying the position of an object including first oscillographic means having means for sweeping the beam thereof successively at different positions across its face, and means for modulating said beam to produce an indication of the position af said object, a functional supplement for said system, said functional supplement comprising: means for producing gating signals at predetermined times that said beam passes through one of the coordinate positions of said object; at least a second oscillographic means; an element delineating an area in the form of a symbol positioned to receive the beam of said second oscillographic means, said symbol representing the identity of said objects; means responsive to said gating signals to initiate the sweep of the beam of said second oscillographic means for producing video signals proportional to the time that the energy of the beam of said second oscillographic means is directed toward the area of said symbol; and means for modulating the beam of said first oscillographic means also in accordance with said video signals, whereby said symbol will always be produced in visual correspondence and will move in synchronism with the position indication of said object on said first oscillographic means.

17. In a system for displaying the position of a plurality of objects including a first cathode-ray tube having means for sweeping the electron beam thereof successively at different positions across its face, and means for modulating said beam to produce indications of the positions of said objects, a functional supplement for said system, said functional supplement comprising: means for producing gating signals at predetermined times that said electron beam passes through the range coordinate positions of said objects; an additional cathode-ray tube for each of said objects; a different element for each of said additional cathode-ray tubes delineating different areas in the form of symbols corresponding to each object; means responsive to gating signals corresponding to each object for sweeping the beam of each additional cathode-ray tube to produce video signals proportional to the time that the energy of the cathode-ray of a corresponding additional tube is directed toward the area of a corresponding symbol; and means for modulating the electron beam of said first tube in accordance with said video signals whereby said symbols will always be produced in visual correspondence to and will move in synchronism with the postion indication of corresponding objects on said first tube.

18. In a system for displaying the position of an object including a first cathode-ray tube having means for sweeping the electron beam thereof successively at different positions across its face, and means for modulating said beam to produce an indication of the position of said object, a functional supplement for said system, said functional supplement comprising: means for producing range pulses at predetermined times that said electron beam passes through the range coordinate position of said object; at least a second cathode-ray tube; an element delineating an area in the form of a symbol, said symbol representing the identity of said object; means responsive to said range pulses for initiating the sweep of the beam of said second tube to produce video signals at the output thereof proportional to the time that the energy of the cathode-ray of said second tube is directed toward the area of said symbol; and means for modulating the electron beam of said first tube also in accordance with said video signals, whereby said symbol will always be produced in visual correspondence and will move in sychronism with the position indication of said object on said first tube.

19. In a system for displaying the position of a plurality of objects including a first cathode-ray tube having means for sweeping the electron beam thereof successively at different positions across its face, and means for modulating said beam to produce indications of the positions of said objects, a functional supplement for said system, said functional supplement comprising: means for producing range pulses at predetermined times that said electron beam passes through the range coordinate positions of said objects; and additional cathode-ray tube for each of said objects; a different element for each of said additional cathode-ray tubes delineating a different area in the form of a symbol corresponding to each object; means responsive to range pulses corresponding to each object for sweeping the beam of each additional cathode-ray tube to produce video signals proportional to the time that the energy of the cathode-ray of a corresponding additional tube is directed toward the area of a corresponding symbol; and means for modulating the electron beam of said first tube in accordance with said video signals whereby said symbols will always be produced in visual correspondence to and will move in synchronism with the position indication of corresponding objects on said first tube.

References Cited in the file of this patent

UNITED STATES PATENTS

| | | |
|---|---|---|
| 2,275,026 | Bedford | Mar. 3, 1942 |
| 2,528,020 | Sunstein | Oct. 31, 1950 |
| 2,581,358 | Busignies et al. | Jan. 8, 1952 |
| 2,605,461 | Koehler | July 29, 1952 |
| 2,622,240 | Fleming-Williams | Dec. 16, 1952 |
| 2,692,381 | Huber | Oct. 19, 1954 |
| 2,741,760 | Franke | Apr. 10, 1956 |

UNITED STATES PATENT OFFICE
CERTIFICATE OF CORRECTION

Patent No. 3,017,628                        January 16, 1962

Robert W. Landee et al.

It is hereby certified that error appears in the above numbered patent requiring correction and that the said Letters Patent should read as corrected below.

Column 3, line 8, for "confromation" read -- conformation --; line 31, before "operated" insert -- is --; column 5, line 2, for "pulse" read -- pulses --; line 20, for "241" read -- tube 41 --; line 25, after "to", second occurrence, insert -- that of --; line 27, for "mounted" read -- maintained --; column 11, line 71, for "af" read -- of --; column 12, line 71, for "and" read -- an --.

Signed and sealed this 10th day of July 1962.

(SEAL)
Attest:

ERNEST W. SWIDER
Attesting Officer

DAVID L. LADD
Commissioner of Patents